US006910279B1

United States Patent
Affa et al.

(10) Patent No.: US 6,910,279 B1
(45) Date of Patent: Jun. 28, 2005

(54) HOLDER FOR A GRADUATED ELEMENT

(75) Inventors: Alfred Affa, Stein (DE); Michael Hermann, Tacherting (DE)

(73) Assignee: Dr. Johannes Heidenhain GmbH, Traunreut (DE)

(*) Notice: Subject to any disclaimer, the term of this patent is extended or adjusted under 35 U.S.C. 154(b) by 0 days.

(21) Appl. No.: 10/844,139

(22) Filed: May 12, 2004

(51) Int. Cl.$^7$ ............................................. G01B 3/00
(52) U.S. Cl. ............................ 33/706; 33/707; 33/708; 33/390
(58) Field of Search ..................... 33/706–708, 1 N, 33/1 PT, 534, 365, 379, 390; 277/593, 596; 248/687

(56) References Cited

U.S. PATENT DOCUMENTS

| | | | |
|---|---|---|---|
| 666,843 A | * | 1/1901 | Brownell ........................ 33/390 |
| 2,453,091 A | * | 11/1948 | Holloway et al. ............. 33/384 |
| 4,776,098 A | | 10/1988 | Nelle |
| 4,777,728 A | | 10/1988 | Ludicke |
| 4,912,856 A | | 4/1990 | Ernst |
| 5,115,573 A | | 5/1992 | Rieder et al. |
| 5,611,148 A | | 3/1997 | Affa |
| 5,630,283 A | | 5/1997 | Nelle |
| 5,711,084 A | | 1/1998 | Spanner et al. |
| 5,735,529 A | * | 4/1998 | Lawrence ..................... 277/596 |
| 6,098,300 A | * | 8/2000 | Angelucci ..................... 33/451 |
| 6,442,861 B1 | | 9/2002 | Böge et al. |
| 6,543,787 B1 | * | 4/2003 | Inciong ......................... 277/593 |
| 6,578,284 B2 | * | 6/2003 | Kawada ......................... 33/706 |
| 2003/0159305 A1 | | 8/2003 | Wahl et al. |

FOREIGN PATENT DOCUMENTS

| | | |
|---|---|---|
| DE | 28 47 979 C2 | 9/1984 |
| DE | G 83 20 137.8 U1 | 11/1984 |
| DE | 36 25 795 C2 | 2/1991 |
| DE | 37 19 409 C2 | 2/1991 |
| DE | 195 13 655 A1 | 11/1995 |
| DE | 44 06 797 C2 | 11/1997 |
| DE | 195 12 892 C2 | 11/1998 |
| DE | 199 12 310 A1 | 9/2000 |
| DE | 102 54 358 A1 | 7/2003 |
| EP | 0 264 801 A1 | 4/1988 |
| EP | 0 480 904 B1 | 4/1994 |
| GB | 2 117 908 A | 10/1983 |

* cited by examiner

*Primary Examiner*—G. Bradley Bennett
*Assistant Examiner*—Tania Courson
(74) *Attorney, Agent, or Firm*—Brinks Hofer Gilson & Lione

(57) ABSTRACT

A graduated element attachment system in a position measuring system, the graduated element attachment system including a graduated element having a circumferential face and a holder. The holder includes a plurality of resilient elements, wherein each one of the plurality of resilient elements engages the circimferential face in such a manner so that the graduated element is clasped in several directions and wherein each of the plurality of resilient elements exerts a force on the graduated element wherein the exerted forces are directed in such a manner so that the plurality of resilient elements maintain the graduated element in equilibrium.

16 Claims, 2 Drawing Sheets

HOLDER FOR A GRADUATED ELEMENT

BACKGROUND OF THE INVENTION

1. Field of the Invention

The present invention relates to a rigid graduated element in a position measuring system, wherein the graduated element is fixed in place on the holder by resilient elements engaging the circumferential face of the graduated element in that the graduated element is clasped in several directions X, Y by the resilient elements and wherein each resilient element exerting a force on the graduated element in one direction is assigned at least one further resilient element which exerts a force on the graduated element in the other direction and maintains the graduated element in an equilibrium.

2. Discussion of Related Art

A widely employed type of fastening a graduated element on a holder is that of gluing. However, it has been shown that gluing does not assure an acceptable stability of the position of the graduated element on the holder. Drifting of the graduated element has been noticed because of the shrinkage of the adhesive over time, the large coefficient of temperature of the adhesive, and the change in its volume in case of moisture.

Therefore gluing is not used in highly precise position measuring systems, and the graduated element is fastened to the holder by clamping. Such a holder of the graduated element is known from EP 0 264 801 A1. For a long term stable and reproducible fastening of the graduated element, the latter is urged against a face of the holder by springs acting on a narrow side. Spheres between this face of the holder and the graduated element make the seating of the graduated element possible and allow rolling movements with respect to the holder.

However, it has been found that this arrangement still results in measurement errors in case of temperature changes. The reason for this is frictional forces arising between the holder and the graduated element during temperature changes.

OBJECT AND SUMMARY OF THE INVENTION

It is therefore an object of the present invention to create a holder, by which the graduated element can be fixed in place over an extended time and in a manner where it is stable against temperature changes.

This object is attained by a graduated element attachment system in a position measuring system, the graduated element attachment system including a graduated element having a circumferential face and a holder. The holder includes a plurality of resilient elements, wherein each one of the plurality of resilient elements engages the circumferential face in such a manner so that the graduated element is clasped in several directions and wherein each of the plurality of resilient elements exerts a force on the graduated element wherein the exerted forces are directed in such a manner so that the plurality of resilient elements maintain the graduated element in equilibrium.

The holder embodied in accordance with the present invention has the advantage that the different expansions of the holder and the graduated element in case of temperature changes do not result in friction between the holder and the graduated element. No constraining forces, which might lead to a deformation or displacement of the graduated element, and thus to measurement errors, are generated.

Exemplary embodiments of the present invention will be explained in greater detail by the drawings.

DETAILED DESCRIPTION OF THE PREFERRED EMBODIMENTS

Figure 1:
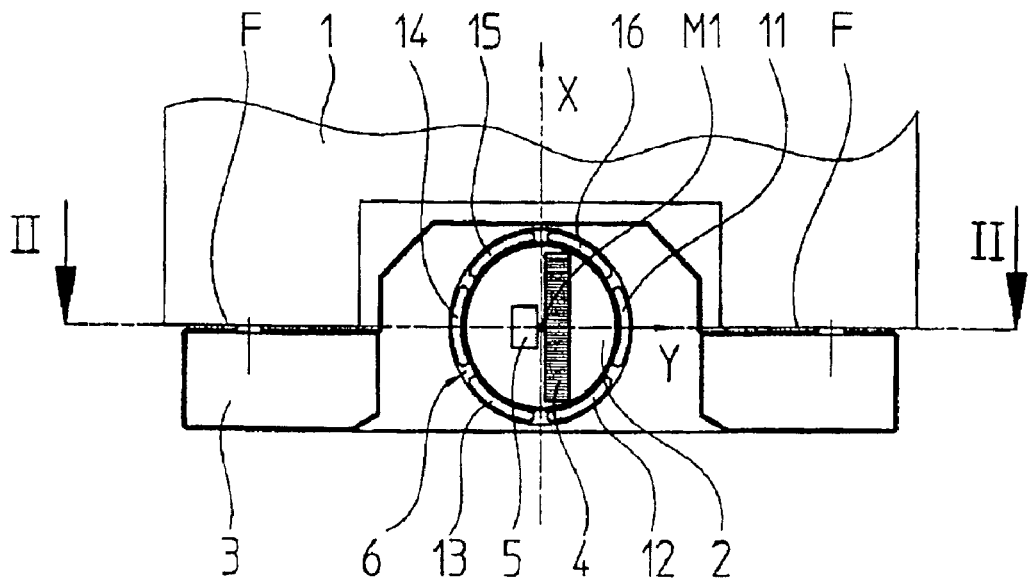
FIG. 1 represents an embodiment of a holder with a scale in a view from above in accordance with the present invention.
Figure 2:
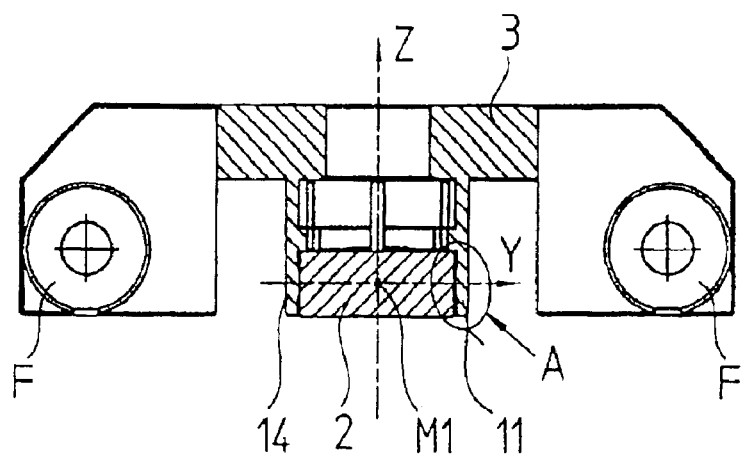
FIG. 2 shows the holder with the scale in accordance with FIG. 1 in a cross-sectional view along the line 2—2 of FIG. 1.
Figure 3:
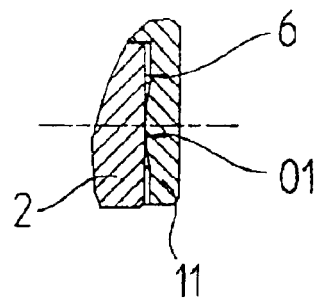
FIG. 3 is an enlarged portion A in FIG. 2.
Figure 5:
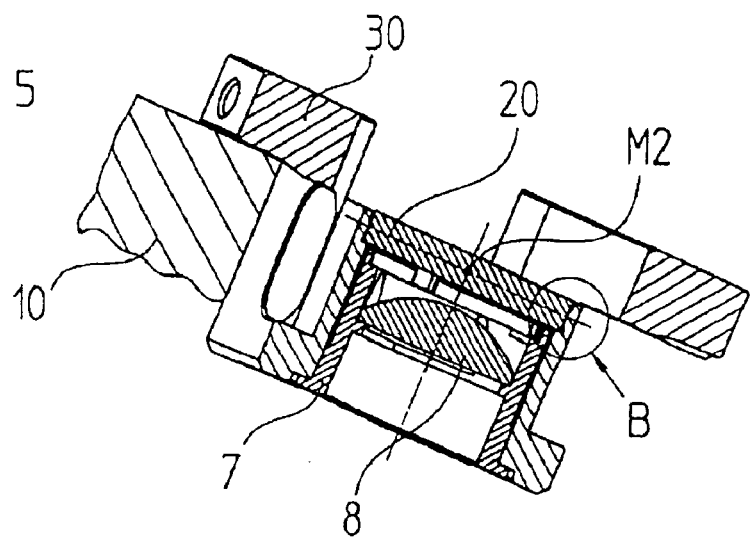
FIG. 5 shows the holder in accordance with FIG. 4 in a cross-sectional view along the line 5—5 of FIG. 4.

A first exemplary embodiment of the present invention is represented in FIGS. 1 to 3. A graduated element in the form of a scale 2 is fastened by a holder 3 on a first machine element 1 for measuring the displacement of the first machine element 1 with respect to a second machine element 10 (FIG. 5). The scale 2 is a rigid, plate-shaped body made of glass, which has on its surface an incremental graduation 4 extending in the measuring direction X, as well as a reference marker 5, which is arranged centered with respect to the course of the graduation 4. The incremental graduation 4 is a phase grating, which can be scanned in transmitted light.

The scale 2 has a circular circumferential face 6. The holder 3 has at least three resilient elements 11 to 16, which act on the circumferential face 6, i.e. the narrow face, of the scale 2 and fix it in place. The spring powers of all resilient elements 11 to 16 are of equal strength and are directed toward the mass center M1 of the scale 2. In this way the scale 2 is clamped centered in the X-Y plane by being clasped in several directions X, Y by the resilient elements 11 to 16. The resilient elements 11 to 16 can be radially deflected for generating the centering clamping forces. The direction of deflection is determined by the connecting line between the mass center M1 of the scale 2 and the contact face between the respective resilient elements 11 to 16 and the circumferential face 6 of the scale 2.

In the represented embodiment, six resilient elements 11 to 16 are arranged evenly distributed over the circumference of the scale 2, wherein a further resilient element 14, 16, 12 is assigned radially opposite each resilient element 11, 13, 15. The respectively radially oppositely located resilient elements 11 to 16 exert equal clamping forces on the scale 2 and maintain it centered and in equilibrium.

For generating the force equilibrium it is also possible to employ two further resilient elements for generating the required resulting opposite force for each resilient element A minimum arrangement for this is an arrangement of three elements, offset by 120° with respect to each other, on the circumference of the scale.

For the simple production of the resilient elements 11 to 16 they are made of a hollow cylinder of little material thickness, in which cuts have been made. The strips between the cuts constitute the resilient elements 11 to 16 in the form of six resilient tongues. The centered fixation of the scale 2 in the holder 3 takes place by pushing the barrel of the tubular body of the scale 2 into the central opening defined by the resilient elements 11 to 16 of the holder 3. The resilient elements 11 to 16 are radially spread apart by this and keep the scale 2 clamped. Following the pressing-in, an equilibrium is created by the exertion of forces and counterforces on the scale 2 via the spring forces of the resilient elements 11 to 16. This equilibrium is maintained, since the deformation of the resilient elements 11 to 16 during the pressing-in process and during subsequent operation is in the elastic range, even with temperature fluctuations.

Even with different coefficients of expansion of the holder 3 and the scale 2, the resilient elements 11 to 16 only move in the radial direction during temperature changes. If the contact face between the resilient elements 11 to 16 on the circumference 6 of the scale is embodied to be small, in particular coming to a point, then there is no relative movement between the contact faces of the scale 2 and the resilient elements 11 to 16. Thus it is assured by the present invention that, because of the different expansion of the scale 2 and the holder 3 during temperature changes, no frictional forces are being generated between the scale 2 and the holder 3. No forces which could cause a positional change of the scale 2 are generated.

As represented enlarged in FIG. 3, the resilient elements 11 to 16 are spherically embodied for creating point-shaped contact faces by having an inward pointing convex surface O1. Each of the convexly curved surfaces O1 of the resilient elements 11 to 16 contacts the scale 2 in the center of its thickness, so that the contact faces, or points, are located in the X-Y plane extending through the mass center M1 of the scale 2.

In the example, the scale 2 is made of glass or a glass-ceramic material, and the holder 3 of metal, in particular steel.

It can be seen in the view from above in FIG. 1 that the opto-electrically scannable incremental graduation 4 is arranged extending in the measuring direction X on the upward facing surface of the scale 2. For an absolute position determination, the reference marker 5 is additionally provided in the center of the measuring area. An attachment face F for fastening the holder 3 on the object 1 to be measured is provided on the holder 3 and defines a plane containing the mass center M1 of the scale 2, as well as the reference marker 5. This plane extends perpendicularly with respect to the measuring direction X.

If, in a way not represented, the position is determined with only one graduation track in that, for example, the reference marker is integrated into the incremental graduation, or single-track absolute coding is employed, the location of the planar center of the scale surface in the center of this single graduation track becomes advantageous.

In the course of measuring the position of the first machine element 1 with respect to the second machine element 10, the scale 2 is scanned by a scanning unit. The scanning unit contains a scanning plate 20 with a scanning structure 40 matched to the incremental graduation 4 and the reference marker 5. The present invention includes the design of a holder 3 of the scale 2 of the position measuring system and/or the design of a holder 30 of the scanning plate 20.

Figure 4:
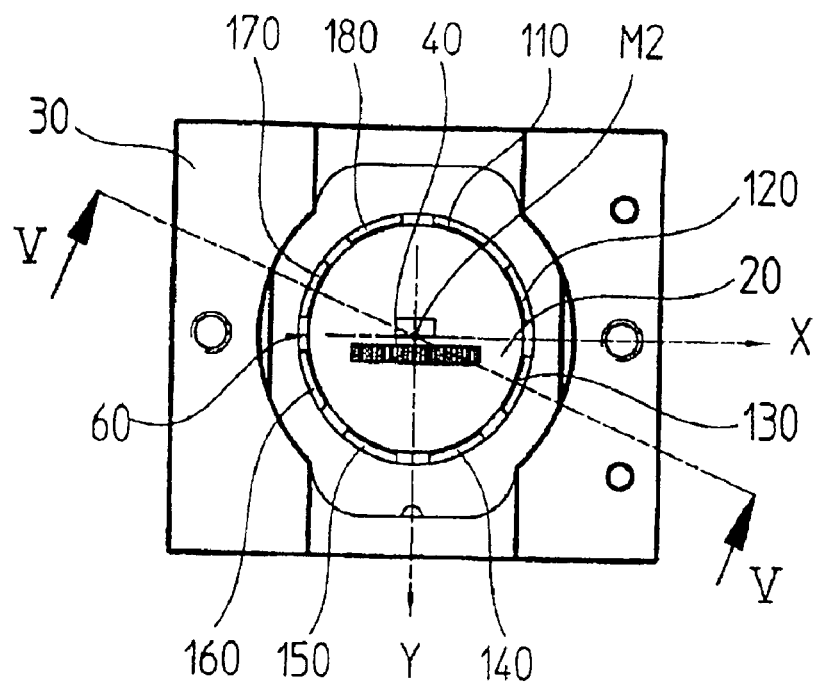
FIG. 4 represents a farther embodiment of a holder with a scanning plate in a view from above in accordance with the present invention.
Figure 6:
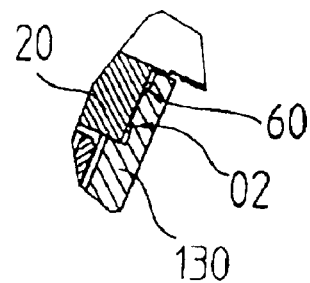
FIG. 6 is an enlarged portion B in FIG. 5.

The embodiment in accordance with the present invention of the holder 30 with the scanning plate 20 is represented in FIGS. 4 to 6. The resilient elements 110 to 180 are designed corresponding to the resilient elements 11 to 16 of the holder 3 of the scale 2. In FIG. 6 the convex surface O2 of the spring element 130 is shown enlarged, as well as how it contacts the scanning plate 20 in the center of its thickness in a pointed manner.

The scanning plate 20 is maintained centered and in equilibrium with the aid of the radially resilient elements 110 to 180. The holder 30 is advantageously also used for receiving an optical imaging device 8. The optical axis of the optical imaging device 8 extends in the Z direction through the mass center M2 of the scanning plate 20. The optical imaging device 8 is held in a retainer, and this retainer is pressed into a section of the hollow cylinder of the holder 30 not containing any cuts for forming the resilient elements 110 to 180.

Besides the exemplary embodiments described, it is understood that alternative variants also exist within the scope of the present invention.

It is therefore intended that the foregoing detailed description be regarded as illustrative rather than limiting, and that it be understood that it is the following claims, including all equivalents, that are intended to define the spirit and scope of this invention.

We claim:

1. A graduated element attachment system in a position measuring system, comprising:
   a graduated element comprising a circumferential face;
   a holder comprising:
   a plurality of resilient elements, wherein each one of said plurality of resilient elements engages said circumferential face in such a manner so that said graduated element is clasped in several directions and wherein each of said plurality of resilient elements exerts a force on said graduated element wherein said exerted forces are directed in such a manner so that said plurality of resilient elements maintain said graduated element in equilibrium.

2. The graduated element attachment system in accordance with claim 1, wherein each one of said plurality of resilient elements has a corresponding further resilient element arranged opposite thereto and which exerts a force opposite to said force exerted by said corresponding one of said plurality of resilient elements.

3. The graduated element attachment system in accordance with claim 1, wherein each of said plurality of resilient elements is deflected in a direction which is determined by a connecting line of a mass center of said graduated element and a corresponding contact point between a corresponding one of said plurality of resilient elements and said circumferential face of said graduated element.

4. The graduated element attachment system in accordance with claim 3, wherein at said contact point said circumferential face of said graduated element extends tangentially with respect to said corresponding connecting line.

5. The graduated element attachment system in accordance with claim 1, wherein said plurality of resilient elements are equally spaced from one another on said circumferential face.

6. The graduated element attachment system in accordance with claim 5, wherein said circumferential face is circular and each one of said plurality of resilient elements can be radially deflected.

7. The graduated element attachment system in accordance with claim 6, wherein each one of said plurality of resilient elements has a corresponding radially oppositely arranged further resilient element associated therewith that exerts an equal, but oppositely force on said graduated element.

8. The graduated element attachment system in accordance with claim 7, wherein each of said plurality of resilient elements is a resilient tongue formed by cuts made in a hollow cylinder.

9. The graduated element attachment system in accordance with claim 6, wherein each of said plurality of resilient elements is a resilient tongue formed by cuts made in a hollow cylinder.

10. The graduated element attachment system in accordance with claim 6, wherein each of said plurality of resilient elements has a convexly curved surface which contacts said circumferential face of said graduated element.

11. The graduated element attachment system in accordance with claim 10, wherein said convexly curved surface contacts said circumferential face in a center of its thickness.

12. The graduated element attachment system in accordance with claim 1, wherein each of said plurality of resilient elements has a convexly curved surface which contacts said circumferential face of said graduated element.

13. The graduated element attachment system in accordance with claim 11, wherein said convexly curved surface contacts said circumferential face in a center of its thickness.

14. The graduated element attachment system in accordance with claim 1, wherein said holder is made of metal and said graduated element is made of glass of a glass-ceramic material.

15. The graduated element attachment system in accordance with claim 1, wherein said graduated element is a scale.

16. The graduated element attachment system in accordance with claim 1, wherein said graduated element is a scanning plate.

* * * * *